(12) United States Patent
Yoshikawa

(10) Patent No.: US 10,150,289 B2
(45) Date of Patent: Dec. 11, 2018

(54) DOT RECORDING APPARATUS, INSPECTION APPARATUS, AND INSPECTION METHOD

(71) Applicant: SEIKO EPSON CORPORATION, Tokyo (JP)

(72) Inventor: Eishin Yoshikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 52 days.

(21) Appl. No.: 15/337,731

(22) Filed: Oct. 28, 2016

(65) Prior Publication Data
US 2017/0120582 A1 May 4, 2017

(30) Foreign Application Priority Data
Nov. 4, 2015 (JP) ................. 2015-216384

(51) Int. Cl.
| | |
|---|---|
| B41J 2/205 | (2006.01) |
| B41J 2/045 | (2006.01) |
| B41J 19/14 | (2006.01) |
| G06K 15/02 | (2006.01) |
| B41J 2/21 | (2006.01) |
| B41J 29/393 | (2006.01) |

(52) U.S. Cl.
CPC ....... B41J 2/04558 (2013.01); B41J 2/04586 (2013.01); B41J 2/2135 (2013.01); B41J 19/142 (2013.01); B41J 19/145 (2013.01); G06K 15/027 (2013.01); *B41J 2029/3935* (2013.01)

(58) Field of Classification Search
CPC combination set(s) only.
See application file for complete search history.

(56) References Cited

U.S. PATENT DOCUMENTS

| | | | |
|---|---|---|---|
| 6,478,400 B1 * | 11/2002 | Endo | B41J 2/16579 347/19 |
| 7,356,918 B2 * | 4/2008 | Okuda | H05K 13/08 29/740 |

(Continued)

FOREIGN PATENT DOCUMENTS

| | | | |
|---|---|---|---|
| EP | 2062734 A1 | 5/2009 | |
| EP | 2062734 B1 * | 7/2013 | ............ B41J 2/2135 |
| JP | 2012-091528 A | 5/2012 | |

OTHER PUBLICATIONS

The Extended European Search Report for the corresponding European Application No. 16197144.5 dated Mar. 20, 2017.

*Primary Examiner* — Matthew Luu
*Assistant Examiner* — Lily Kemathe

(57) ABSTRACT

Provided is a dot recording apparatus in which a first dot group is formed using a first nozzle group, a second dot group is formed using a second nozzle group, a third dot group is formed using a third nozzle group, of which the distance from the first nozzle group in a direction is a first nozzle row distance, a fourth dot group is formed using a fourth nozzle group, of which the distance from the second nozzle group in a direction is a second nozzle row distance, which differs from the first nozzle row distance, and inclination of the main scanning direction and a nozzle row are calculated on the basis of a distance in the main scanning direction from the first dot group up to the third dot group, and a distance in the main scanning direction from the second dot group up to the fourth dot group.

15 Claims, 9 Drawing Sheets

(56) References Cited

U.S. PATENT DOCUMENTS

| | | | |
|---|---|---|---|
| 7,552,984 B2* | 6/2009 | Hayashi | B41J 19/145 347/12 |
| 2002/0044165 A1* | 4/2002 | Otsuki | B41J 11/0065 347/5 |
| 2006/0197793 A1* | 9/2006 | Takahashi | B41J 2/205 347/15 |
| 2007/0008354 A1 | 1/2007 | Hayashi et al. | |
| 2007/0008363 A1 | 1/2007 | Hamasaki et al. | |
| 2008/0250636 A1* | 10/2008 | Okuda | H05K 13/08 29/834 |
| 2009/0225120 A1 | 9/2009 | Hayashi et al. | |
| 2012/0120152 A1* | 5/2012 | Ogura | B41J 2/2054 347/37 |
| 2013/0106934 A1 | 5/2013 | Hayashi et al. | |
| 2014/0132657 A1 | 5/2014 | Hayashi et al. | |
| 2014/0292850 A1* | 10/2014 | Matsumura | B41J 2/2135 347/9 |

* cited by examiner

DOT RECORDING APPARATUS, INSPECTION APPARATUS, AND INSPECTION METHOD

BACKGROUND

1. Technical Field

The present invention relates to inspection of a dot recording apparatus.

2. Related Art

When a recording head is inclined with respect to a main scanning direction, the recording positions of dots are shifted. The following method is known as a technique with the aim of correcting such shifting. Dot groups (check patterns) are recorded by dividing a nozzle row of a recording head into a plurality of nozzle groups, and forming dot groups using each nozzle group. Driving timings other than that of a nozzle group that acts as a reference for correction, are corrected on the basis of positional relationships of the dot groups (JP-A-2012-91528).

It is not possible to apply the above-mentioned related art to a method that captures an image of dot groups using an image sensor, which is mounted in a recording head. The reason for this is that when a recording head is inclined, the image sensor is also inclined in the same manner, and therefore, it is not possible to calculate the inclination of the recording head.

SUMMARY

An advantage of some aspects of the invention is to calculate inclination of a recording head in a method that captures an image of dot groups using an image sensor that is mounted in the recording head.

The invention can be realized in the following aspects.

According to an aspect of the invention, there is provided a dot recording apparatus including a main scan driving mechanism that executes a main scan pass, which records dots on a medium while relatively moving a recording head having a nozzle row that includes a plurality of nozzle groups, which are configured by a plurality of nozzles that are arranged in a direction that intersects a main scanning direction, and the medium in the main scanning direction, a sub-scan driving mechanism that executes a sub-scan, which relatively moves the medium and the recording head in a sub-scanning direction, which intersects the main scanning direction, an image sensor that captures an image of dots formed on the medium, and a control section, in which the control section executes a first formation that forms a first dot group using a first nozzle group, a second formation that forms a second dot group in a position that differs from that of the first dot group in either the main scanning direction or the sub-scanning direction, using a second nozzle group, a third formation that forms a third dot group in which the position in the sub-scanning direction overlaps with at least a portion of the first dot group, using a third nozzle group, of which the distance from the first nozzle group in a direction of the nozzle row is a first nozzle row distance, a fourth formation that forms a fourth dot group in which the position in the sub-scanning direction overlaps with at least a portion of the second dot group, using a fourth nozzle group, of which the distance from the second nozzle group in a direction of the nozzle row is a second nozzle row distance, which differs from the first nozzle row distance, and a calculation of inclination of the recording head with respect to the medium based on a first distance in the main scanning direction from the first dot group up to the third dot group, and a second distance in the main scanning direction from the second dot group up to the fourth dot group, which are acquired using the image sensor. According to the aspect, it is possible to calculate the inclination of the recording head on the basis of an image capture result from the image sensor. The reason for this is that the relationship between the first distance and the first nozzle row distance, and the relationship between the second distance and the second nozzle row distance reflect the inclination of the recording head with respect to the medium.

In the dot recording apparatus, the nozzles that configure the first nozzle group and the nozzles that configure the second nozzle group may differ from one another, and the first formation and the second formation may be executed in the same main scan. According to the aspect, the first formation and the second formation need not necessarily be executed in separate main scan passes.

In the dot recording apparatus, a position of the recording head in the main scanning direction in the first formation may be the same as a position of the recording head in the main scanning direction in the second formation. According to the aspect, the ejection of ink for forming the first dot group and the second dot group may be executed simultaneously.

In the dot recording apparatus, a distance from a position of the recording head in the main scanning direction in the first formation up to a position of the recording head in the main scanning direction in the third formation may be equivalent to a distance from a position of the recording head in the main scanning direction in the second formation up to a position of the recording head in the main scanning direction in the fourth formation. According to the aspect, it is easier to exclude the influence of the position of the recording head in the main scanning direction from the calculation of inclination.

In the dot recording apparatus, at least two sub-scans may be executed during a period from a point of a formation, among the first to the fourth formation, which is executed first up to a point of a formation that is executed last, and all orientations of the at least two sub-scans may be the same. According to the aspect, sub-scans having different orientation need not be executed.

In the dot recording apparatus, the nozzles that configure the second nozzle group may be the same as the nozzles that configure the third nozzle group. According to the aspect, four nozzle groups need not be used in the first to fourth formations.

In the dot recording apparatus, the second nozzle row distance may be twice the first nozzle row distance. According to the aspect, it is possible to avoid a circumstance in which the first to fourth nozzle groups stretch across a very large region.

In the dot recording apparatus, the control section may execute a fifth formation that forms a fifth dot group using a fifth nozzle group, a sixth formation that forms a sixth dot group in which the position in the sub-scanning direction overlaps with at least a portion of the fifth dot group, using a sixth nozzle group, of which the pitch from the fifth nozzle group is a third nozzle row distance, which differs from both the first nozzle row distance and the second nozzle row distance, and the calculation of inclination on the basis of a result in which the first distance, the second distance, and a distance in the main scanning direction from the fifth dot group up to the sixth dot group are statistically processed. According to the aspect, the accuracy of the calculation of inclination is improved.

In the dot recording apparatus, the first formation and the third formation may be executed during main scans having the same orientation, and the second formation and the fourth formation may be executed during main scans having the same orientation. According to the aspect, it is possible to avoid the shifting of landing positions due to orientations of the main scans differing.

In the dot recording apparatus, all lengths of the first to fourth dot groups may be the same. According to the aspect, a feed amount of a plurality of repetitions of sub-scans, which are executes in a period from the first to the fourth formation, need not be changed depending on the length of the dot group.

In the dot recording apparatus, a measurement line for image sensor correction may be formed in order to acquire an inclination of the image sensor, and the inclination of the recording head may be corrected by adding an image capture result of the measurement line for image sensor correction from the image sensor. According to the aspect, it is possible to suppress the influence that inclination of the image sensor exerts on inclination calculation.

In the dot recording apparatus, at least either one of the first dot group and the second dot group may be a portion of the measurement line for image sensor correction. According to the aspect, it is possible to reduce the work time of the formation of the measurement line for image sensor correction.

In the dot recording apparatus, formation of a first measurement line for sub-scan correction in which the position in the sub-scanning direction overlaps with at least a portion of the first dot group, using a predetermined nozzle group, which is any one of the plurality of nozzle groups, formation of a second measurement line for sub-scan correction in which the position in the sub-scanning direction overlaps with at least a portion of the second dot group, using the predetermined nozzle group, and calculation of inclination in the main scanning direction and the sub-scanning direction on the basis of a distance in the main scanning direction from the first dot group up to the first measurement line for sub-scan correction, and a distance in the main scanning direction from the second dot group up to the second measurement line for sub-scan correction, which are acquired using the image sensor, may be executed. According to the aspect, it is possible to calculate the inclination in the main scanning direction and the sub-scanning direction.

The invention can be realized using various forms other than those above. For example, the invention can be realized as an inspection apparatus or an inspection method, or as a computer program for realizing such a method, a non-temporary storage medium on which such a computer program is stored, or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
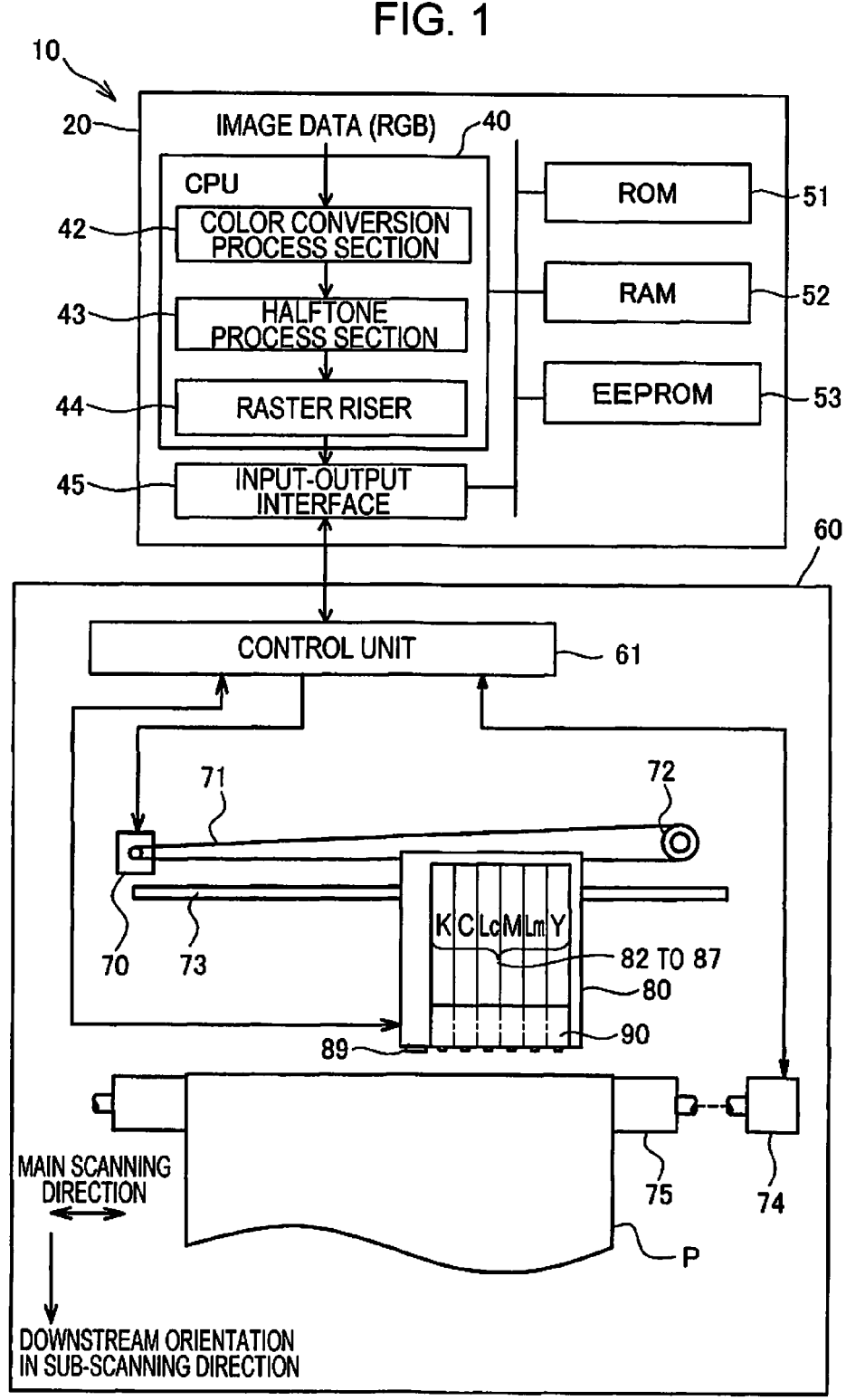
FIG. 1 is a configuration diagram of a dot recording apparatus.

FIG. 1 shows a configuration of a dot recording apparatus 10. More specifically, the dot recording apparatus 10 is a printing apparatus. The dot recording apparatus 10 is provided with an image processing unit 20, and a dot recording unit 60. The image processing unit 20 (a control section) creates printing data for the dot recording unit 60 from image data (for example, RGB image data).

The image processing unit 20 is provided with a CPU 40, a ROM 51, a RAM 52, an EEPROM 53, and an input-output interface 45. The image processing unit 20 realizes functions of a color conversion process section 42, a halftone process section 43, and a raster riser 44. The image processing unit 20 is realized as a result of the execution of these functions by a computer program. The computer program is stored in the ROM 51.

The color conversion process section 42 converts multi-gradation RGB data of an image into ink amount data. The ink amount data shows respective ink amounts of a plurality of colors of ink. The halftone process section 43 creates dot data, which shows the presence or absence of dot formation for each pixel, as a result of executing a halftone process on the ink amount data.

The raster riser 44 corrects the dot data created in the halftone process into a format that can be used in the ejection of ink by the dot recording unit 60. Hereinafter, dot data for each main scan, which is created by the raster riser 44, will be referred to as "raster data".

The dot recording unit 60 is a serial type ink jet recording apparatus. The dot recording unit 60 is provided with a control unit 61, a carriage motor 70, a driving belt 71, a pulley 72, a sliding shaft 73, a paper feeding motor 74, a paper feeding roller 75, a carriage 80, ink cartridges 82 to 87, and a recording head 90.

The driving belt 71 is stretched between the carriage motor 70 and the pulley 72. The carriage 80 is attached to the driving belt 71. For example, the ink cartridges 82 to 87, which respectively accommodate cyan ink (C), magenta ink (M), yellow ink (Y), black ink (K), light cyan ink (Lc), and light magenta ink (Lm), are installed in the carriage 80. Nozzle rows, which corresponds to each of the colors of ink mentioned above, are formed in the recording head 90 in the lower portion of the carriage 80. When these ink cartridges 82 to 87 are mounted in the carriage 80 from above, it is possible to supply ink to the recording head 90 from each cartridge. The sliding shaft 73 is disposed parallel to the driving belt, and penetrates through the carriage 80.

When the carriage motor 70 drives the driving belt 71, the carriage 80 moves relatively along the sliding shaft 73 with respect to a recording medium P. This direction of movement will be referred to as a "main scanning direction". The carriage motor 70, the driving belt 71 and the sliding shaft 73 configure a main scan driving mechanism. The ink cartridges 82 to 87 and the recording head 90 also move in the main scanning direction along with the movement of the carriage 80 in the main scanning direction. Dot recording is executed on a recording medium P as a result of ink being ejected onto the recording medium P from nozzles (to be described later), which are mounted in the recording head 90, during movement in the main scanning direction. In this manner, movement of the recording head 90 in the main scanning direction and the ejection of ink will be referred to as a main scan, and a single one-way main scan in one will be referred to as a "main scan pass". In a case in which printing is executed, ink is respectively ejected in a movement with an outgoing path orientation and in a movement with a return path orientation of a main scan.

The paper feeding roller 75 is connected to the paper feeding motor 74. During recording, a recording medium P is inserted onto the paper feeding roller 75. When the carriage 80 moves up to an end portion in the main scanning direction, the control unit 61 rotates the paper feeding motor 74. As a result of this, the paper feeding roller 75 rotates, and the recording medium P is moved with respect to the recording head 90. A movement direction of the recording medium P will be referred to as a "sub-scanning direction". The paper feeding motor 74 and the paper feeding roller 75 configure a sub-scan driving mechanism. The sub-scanning direction is a direction that intersects the main scanning direction, and in the present embodiment, is a direction that is orthogonal the main scanning direction. The downstream orientation in the sub-scanning direction that is shown in FIG. 1 shows an orientation in which the recording head 90 moves relatively with the recording medium P set as a reference. In a practical sense, the recording medium P is transported having an orientation that is opposite to the downstream orientation in the sub-scanning direction.

Figure 2:
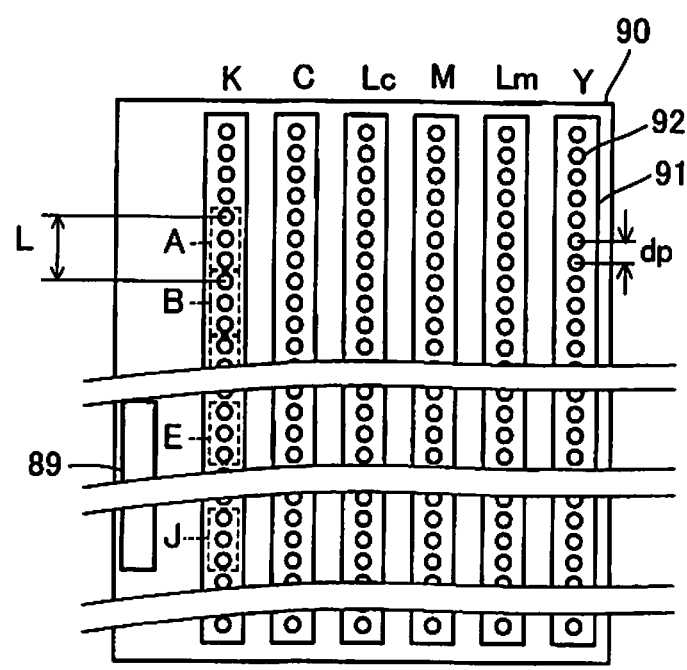
FIG. 2 is a configuration diagram of a nozzle row of a recording head.

FIG. 2 shows an example of a configuration of nozzle rows of the recording head 90. The recording head 90 is provided with a nozzle row 91 for each color. Each nozzle row 91 is provided with a plurality of nozzles 92, which are aligned at a constant nozzle pitch dp. Hereinafter, the direction in which the nozzles 92 are aligned in each nozzle row 91 will be referred to as a nozzle row direction.

In the present embodiment, as shown in FIG. 2, portions of the nozzles 92 that eject black ink (K) are classified as one of a nozzle group A to a nozzle group J. All of the numbers of the nozzles 92 that belong to the nozzle group A to the nozzle group J are the same. In the present embodiment, as shown in FIG. 2, three is illustrated as this number by way of example. There are not any nozzles 92 that do not belong to a nozzle group between adjacent nozzle groups. Accordingly, the pitch with which the nozzle groups are arranged is equivalent to the nozzle pitch dp×(the number of nozzles 92 that belong to each nozzle group). The pitch that is referred to in this instance is a distance in a nozzle row direction, and is a distance from a predetermined nozzle 92 that is included in a certain nozzle group (for example, a nozzle 92 that is positioned furthest upstream in the sub-scanning direction) up to a predetermined nozzle 92 that is included in a nozzle group that is next to the above-mentioned nozzle group. Hereinafter, the pitch will be referred to as a nozzle group pitch L.

The recording head 90 is provided with an image sensor 89. The image sensor 89 captures an image of dots that are formed on the recording medium P. A captured image is input to the CPU 40 through the input-output interface 45. The image sensor 89 is disposed so that it is possible to capture an image of a range in the sub-scanning direction from the nozzle group E up to the nozzle group J. The reason for the image sensor 89 being disposed in this manner is so that a sufficient image capturing range that is required in order to execute S180 (FIG. 3), which will be described later, using a single one-way main scan, is realized.

Figure 3:
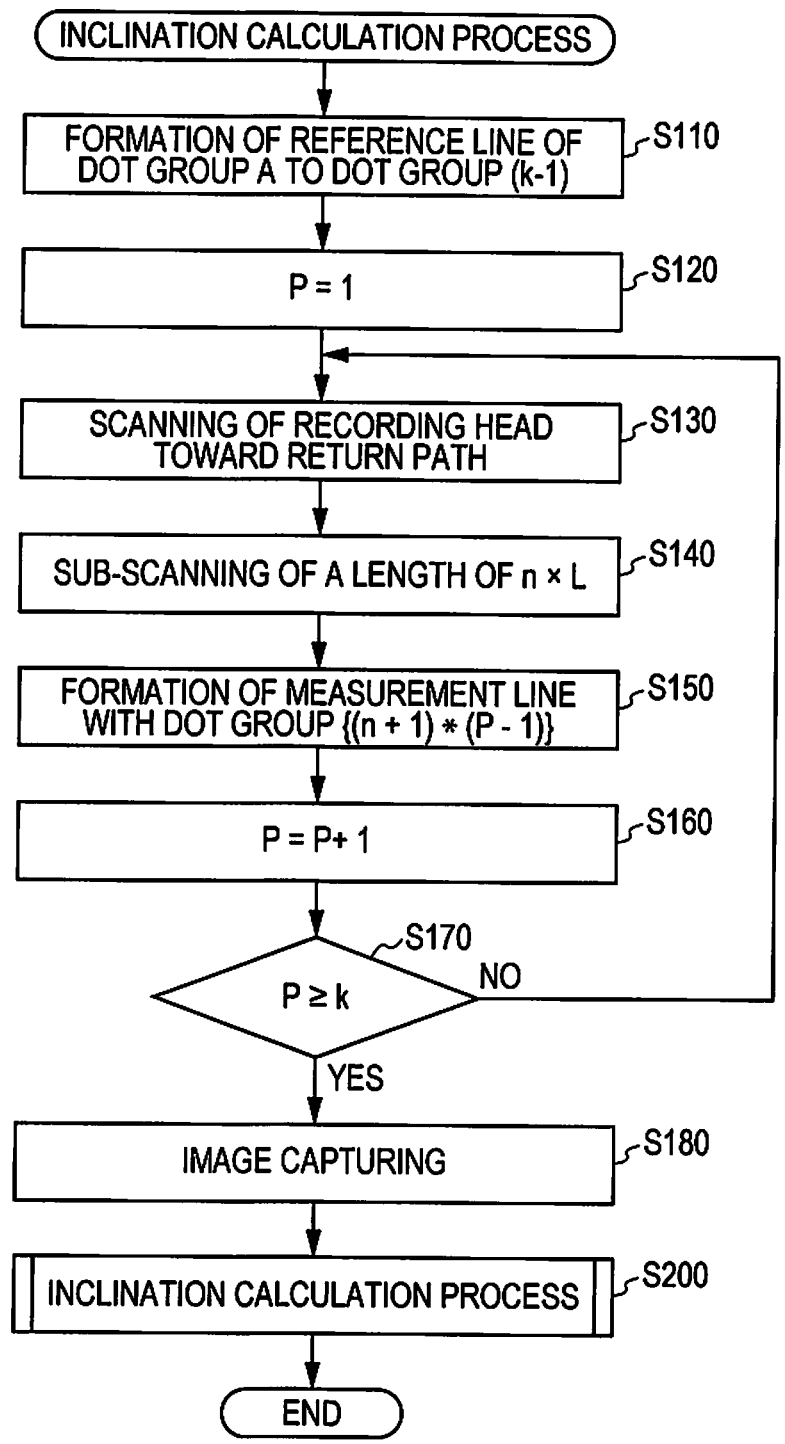
FIG. 3 is a flowchart that shows an inclination acquisition process.
Figure 4:
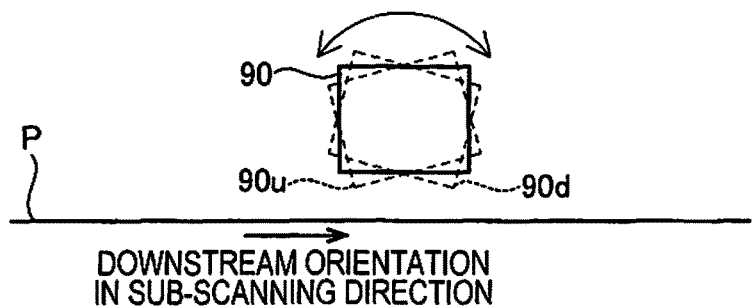
FIG. 4 is an upper surface view that shows a state in which the recording head is inclined.

FIG. 3 is a flowchart that shows an inclination acquisition process. The process is executed as a result of the image processing unit 20 controlling the main scan driving mechanism and the sub-scan driving mechanism. As shown in FIG. 4, the inclination that is referred to in this instance corresponds to pitching of the recording head 90 in a case in which the sub-scanning direction is set as a front-back direction. Or in other words, corresponds to rolling of the recording head 90 in a case in which the main scanning direction is set as a front-back direction. Hereinafter, in cases in which the recording head 90 is referred to as being "inclined", it refers to inclination in the directions that re shown in FIG. 4.

The reference symbol 90u, which is shown in FIG. 4, shows the recording head in a case of being inclined on the upstream side in the sub-scanning direction. The description "inclined on the upstream side in the sub-scanning direction" refers being inclined in a manner in which an end portion on the upstream side of the recording head 90 approaches the recording medium P. The reference symbol 90d, which is shown in FIG. 4, shows the recording head in a case of being inclined on the downstream side in the sub-scanning direction. Hereinafter, the descriptions "inclined on the upstream side (the downstream side) in the sub-scanning direction" will be shortened to "inclined on the upstream side (the downstream side)".

Firstly, a reference line is formed by a dot group A to a dot group (k-1) (the dot groups will be mentioned later together with FIGS. 5 to 7) using a first main scan pass (S110). S110 is executed using a main scan pass with the outgoing path orientation. In the present embodiment, k=6 (=F) is set. k is a constant that shows the number of repetitions of main scan passes that accompany ink ejection up to a point at which a measurement line group (to be described later) is completed.

In the present specification, the letters of the alphabet that are continuously given to the dot groups and the nozzle groups are handled as integers. In other words, A to J are respectively handled in an equivalent manner to 1 to 10, and are set as targets for basic arithmetic operations with numerical values. In addition, in a case in which continuous numerical characters are specified first the dot groups and the nozzle groups as a result of basic arithmetic operation, the numerical characters are handled by conversion into the corresponding letter of the alphabet.

Figure 5:
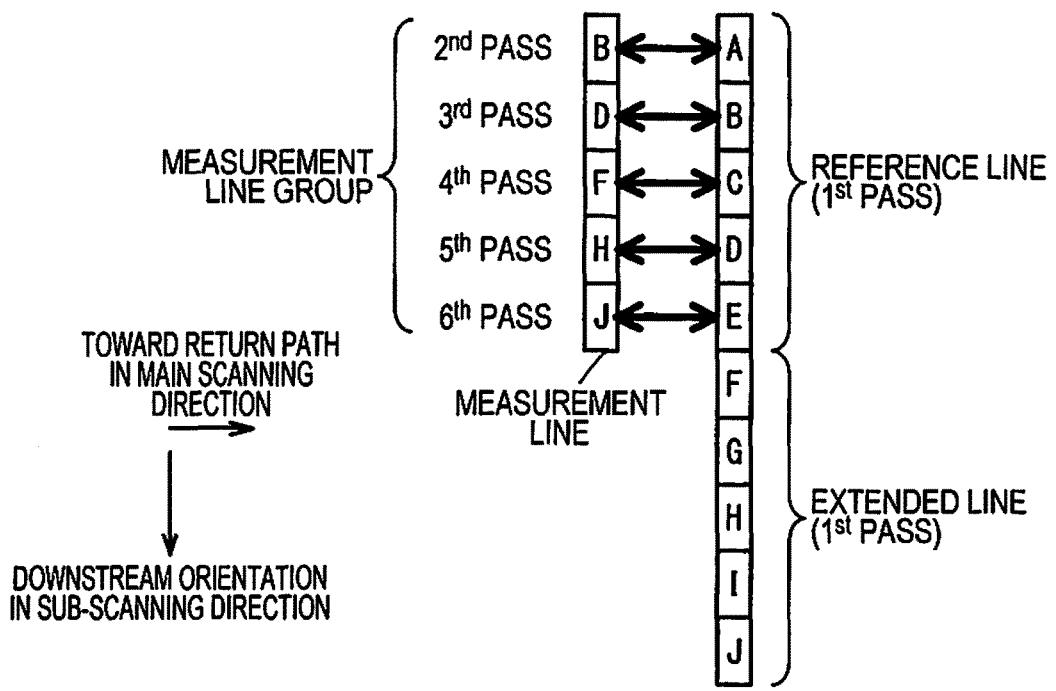
FIG. 5 is a reference line and a measurement line group in a case in which the recording head is not inclined.
Figure 6:
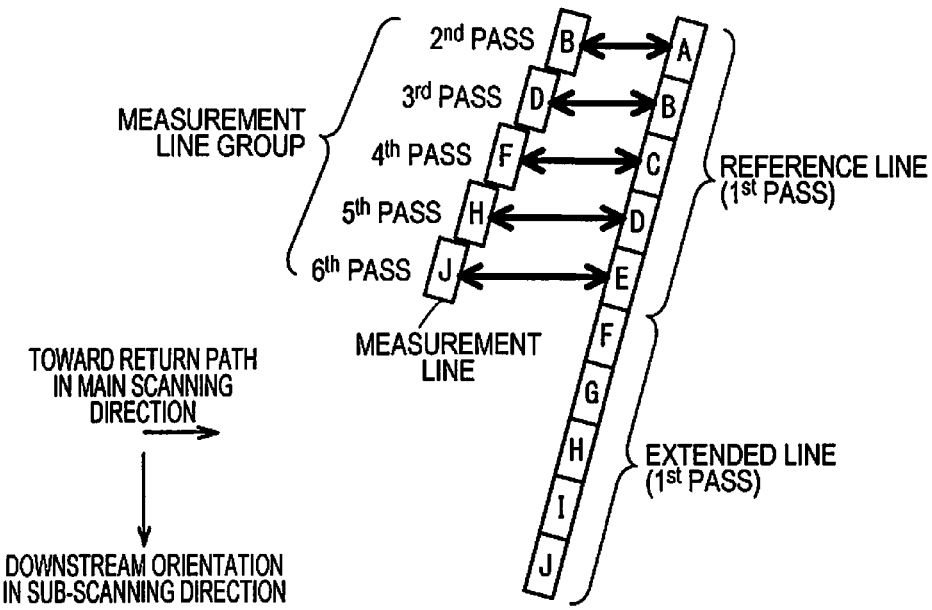
FIG. 6 is a reference line and a measurement line group in a case in which the recording head is inclined on a downstream side.
Figure 7:
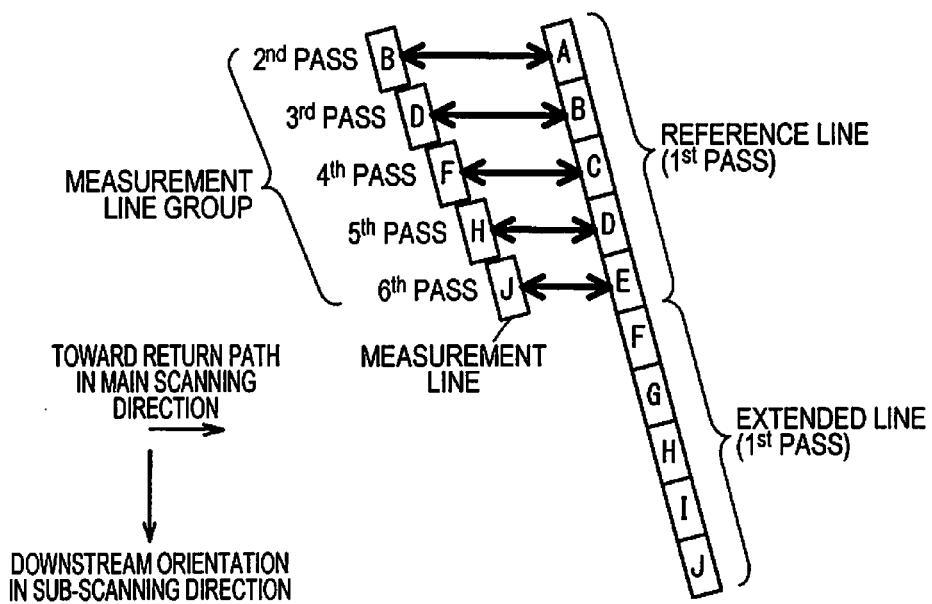
FIG. 7 is a reference line and a measurement line group in a case in which the recording head is inclined on an upstream side.

FIGS. 5 to 7 illustrate reference lines and measurement line groups by way of example. As will be described in more detail later, the term measurement line group refers to an aggregation of (k-1) measurement lines. FIG. 5 shows a case in which the recording head 90 is not inclined. FIG. 6 shows a case of the recording head 90d, which is inclined on the downstream side. FIG. 7 shows a case of the recording head 90u, in which the recording head 90 is inclined on the upstream side.

In FIGS. 5 to 7, the letters of the alphabet that are stored in oblong form are pieces of information that specify a dot group. The term dot group refers to an aggregation of dots that are formed in a single row by all of the nozzles, which belong to nozzle groups of the same letter of the alphabet. The oblong form that stores the letters of the alphabet is a graphic in which an aggregation of dots is simplified. The direction in which the long edge of the oblong form extends coincides with a direction of a row in which the aggregation of dots is formed.

The recording head 90 ejects black ink for forming all of the dot groups that configure the reference line simultaneously. Therefore, all of the dot groups that configure the reference line are formed in the same position in the main scanning direction. Therefore, the reference line is a straight line. Hereinafter, when the term "position in the main scanning direction" is used, it refers to where in the main scanning direction the recording head 90 is positioned.

Since the dot group A to the dot group J are formed using ink that is discharged from the same number of nozzles 92, the lengths of all of the dot group A to the dot group J are equivalent. The lengths of the dot groups that is referred to in this instance is the length in a direction in which dots that configure a dot group are arranged. Additionally, in the present embodiment, an extended line of the reference line is formed by the dot group F to the dot group J.

As shown in FIGS. 6 and 7, the reason why reference line is inclined is that the recording head 90 is inclined. For example, in the case that is shown in FIG. 6, since the recording head 90 is inclined on the downstream side, a distance to the recording medium P of the nozzles 92, which are positioned on the downstream side, is shorter than that of the nozzles 92, which are positioned on the upstream side. Therefore, a flight distance of ink droplets that are ejected from the nozzles 92, which are positioned on the downstream side, is shorter than that of ink droplets that are ejected from the nozzles 92, which are positioned on the upstream side. As a result of this, ink droplets that are ejected from the nozzles 92, which are positioned on the downstream side, land further on the upstream side (the left side in FIG. 6) in a main scan than ink droplets that are ejected from the nozzles 92, which are positioned on the upstream side. Since a trajectory of flight of ink droplets is substantially a straight line, the reference line is also substantially a straight line.

In S110, the formation of one dot group among the dot groups (the dot group A to the dot group E) that configure the reference line is referred to as a first formation. A nozzle group for executing the first formation is referred to a first nozzle group. A dot group that is formed by the first formation is referred to as a first dot group.

In S110, the formation of one dot group (excluding the dot group that is formed by the first formation) among the dot groups that configure the reference line is referred to as a second formation. A nozzle group for executing the second formation is referred to a second nozzle group. A dot group that is formed by the second formation is referred to as a second dot group. The second dot group is formed in a position that differs from that of the first dot group in either the main scanning direction or the sub-scanning direction. In the present embodiment, the second dot group is formed in a position that differs from that of the first dot group in the sub-scanning direction.

In S110, the formation of one dot group (excluding the dot groups that are formed by the first and second formations) among the dot groups that configure the reference line is referred to as a fifth formation. A nozzle group for executing the fifth formation is referred to a fifth nozzle group. A dot group that is formed by the fifth formation is referred to as a fifth dot group.

In the present embodiment, the formation of the dot group A is set as the first formation, the formation of the dot group B is set as the second formation, and the formation of the dot group C is set as the fifth formation.

Next, 1 is stored as a variable P(S120). The variable P is a variable for counting the number of repetitions of main scans that accompany ink ejection that have been completed. Since the formation of the reference line is counted as a first pass, P=1 is set in S120.

Next, the recording head 90 scans with the return path orientation (S130). Since dots are not formed at this time, the scan is not included in the number of repetitions of main scan passes that accompany ink ejection.

Next, a sub-scan of the length of the n×the nozzle group pitch L is executed (S140). n (a nonnegative integer) is a constant for specifying nozzle groups that form a measurement line, and in the present embodiment, n=1 is set.

Next, a measurement line of a dot group $\{(n+1)\times(P-1)\}$ is formed (S150). All of the measurement lines are formed in the same position in the main scanning direction.

If it is the second pass, since 2 is obtained when n=1 and P=2 is substituted into the above-mentioned formula, it can be understood that the dot group B is formed as the measurement line.

Next, 1 is added to P(S160). Subsequently, it is determined whether or not P is k or more (S170). In a case in which P is less than k (S170, NO), the process returns to S130.

In this manner, the measurement line groups that are shown in FIGS. 5 to 7 are completed by executing S130 to S170 (k-1) times.

In S150, the formation of a dot group in the same position as the position in the sub-scanning direction of the first dot group that is formed by the first formation is referred to as a third formation. A nozzle group for executing the third formation is referred to a third nozzle group. A dot group that is formed by the third formation is referred to as a third dot group. In the present embodiment, the formation of the dot group B as a measurement line corresponds to the third formation.

In S150, the formation of a dot group in the same position as the position in the sub-scanning direction of the second dot group that is formed by the second formation is referred to as a fourth formation. A nozzle group for executing the fourth formation is referred to a fourth nozzle group. A dot group that is formed by the fourth formation is referred to as a fourth dot group. In the present embodiment, the formation of the dot group D as a measurement line corresponds to the fourth formation.

In S150, the formation of a dot group in the same position as the position in the sub-scanning direction of the fifth dot group that is formed by the fifth formation is referred to as a sixth formation. A nozzle group for executing the sixth formation is referred to a sixth nozzle group. A dot group that is formed by the sixth formation is referred to as a sixth dot group. In the present embodiment, the formation of the dot group F as a measurement line corresponds to the sixth formation.

When it is determined that P is k or more (P=k=6) (S170, YES), an image is captured of the reference line and the measurement line group with the image sensor 89 using a main scan with the return path orientation (S180).

Figure 8:
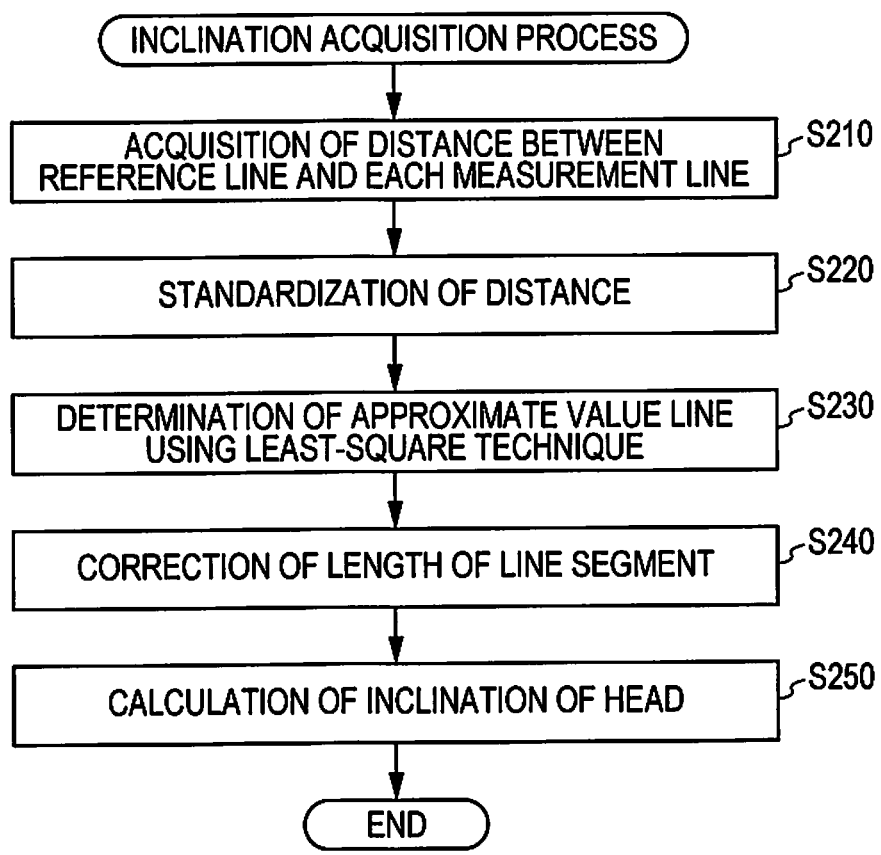
FIG. 8 is a flowchart that shows an inclination calculation process.
Figure 9:
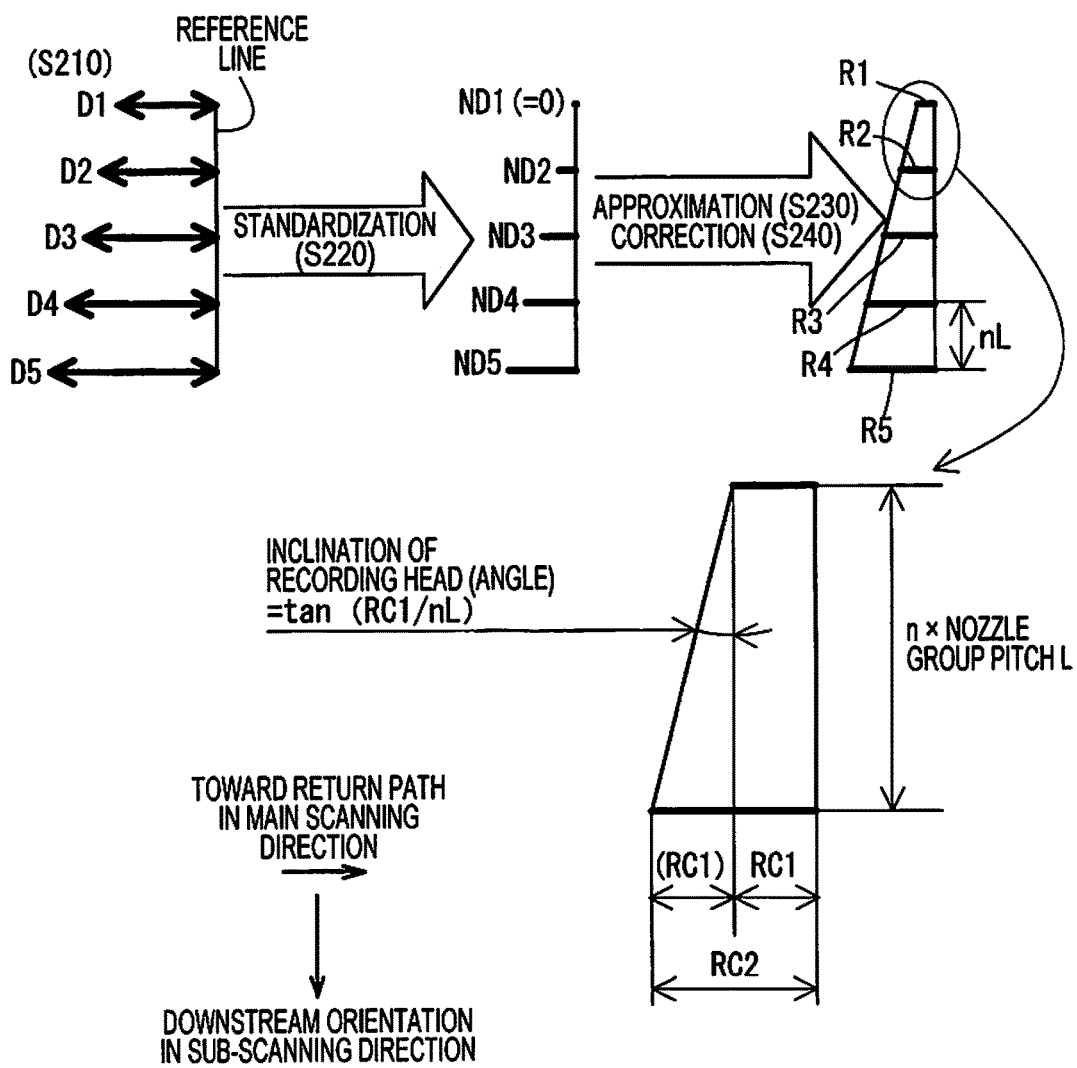
FIG. 9 is a view that describes a summary of inclination calculation.

Lastly, an inclination calculation process is executed (S200). FIG. 8 is a flowchart that shows the inclination calculation process. FIG. 9 is a view that describes a summary of the calculation. In the description of FIG. 9, a case of the inclination (inclination on the downstream side) that is shown in FIG. 6, is taken as an example.

Firstly, distances between the reference line and each measurement line are acquired from an image capture result (S210). In FIG. 9, these are shown as a first distance D1 to a fifth distance D5. A distance Dm is a distance in the main scanning direction between a dot group m that is included in the reference line, and a measurement line that is formed in an $(m-1)^{th}$ pass.

Next, the first distance D1 to the fifth distance D5 are standardized (S220). More specifically, as shown in FIG. 9, among the acquired distances, the value of the distance having the smallest value is respectively subtracted from the first distance D1 to the fifth distance D5. In the case that is shown in FIG. 9, since the first distance D1 is the smallest, the first distance D1 is respectively subtracted from the first distance D1 to the fifth distance D5. A distance in which a first distance Dm is standardized is denoted as a distance NDm. A line segment that shows the distance NDm is denoted as a line segment Rm. Additionally, the length of a line segment R1 is zero (a distance ND1=0), but for the sake of convenience, is treated as a line segment.

Next, an approximation straight line is determined (S230). The approximation straight line is a regression straight line in which end points of line segments R1 to R5 are set as samples, and is determined by having passing through the end point of the line segment R1 as a condition. The end points that are used in this instance are end points that are different from the end points on the reference line. A least-square technique is used in S230. In addition, a distance between adjacent line segments is set as a provisional value (n×nozzle group pitch L).

Next, the lengths of the line segments R1 to R5 are corrected (S240). More specifically, after adjusting the lengths of the line segments R1 to R5 so that a conditions of the end points of the line segments R1 to R5 being positioned on the approximation straight line, is satisfied, each line segment is extended by an amount that is equivalent to the length of the line segment R2 after adjustment. The post-adjustment length of a line segment Rm is denoted as a length RCm.

A length RCm that is determined in this manner is correlated with the distance between nozzle groups. Or more specifically, has a substantially proportional relationship with the distance between nozzle groups. The distance between nozzle groups is a distance in the nozzle row direction from a nozzle group that forms a dot group that is included in the reference line, up to a nozzle group that forms a dot group as a measurement line that forms a pair with the above-mentioned dot group. In the same manner as the nozzle group pitch L, the distance from a certain nozzle group up to another nozzle group is defined by a distance between nozzles of the same position (for example, a position that is furthest upstream in the sub-scanning direction) within a nozzle group. Hereinafter, this kind of distance will be referred to as a nozzle row distance.

The nozzle row distance from the first nozzle group (the nozzle group A) up to the third nozzle group (the nozzle group B) will be referred to as a first nozzle row distance. In the case of the present embodiment, the first nozzle row distance is equivalent to the nozzle group pitch L. The nozzle row distance from the second nozzle group (the nozzle group B) up to the fourth nozzle group (the nozzle group D) will be referred to as a second nozzle row distance. In the case of the present embodiment, the second nozzle row distance is equivalent to twice the nozzle group pitch L. Accordingly, the second nozzle row distance is twice the first nozzle row distance.

Lastly, the inclination of the recording head 90 is calculated (S250). More specifically, an angle is calculated using tan {length RC1/(n×nozzle group pitch L)}. Additionally, as is evident from the description up until this point, instead of referring to an actual value of an inclination angle of the recording head 90 with the recording medium P as a reference, the "inclination of the recording head 90" that is calculated in the present embodiment refers to an inclination angle of a formed image, which is caused by inclination of the recording head 90.

As shown in FIG. 7, it is also possible to perform calculation in a case of inclination on the upstream side. In this case, an angle that shows the inclination is handled as a negative value.

According to the embodiment described above, it is possible to calculate the inclination of the recording head 90 using the image sensor 89, which is mounted in the recording head 90.

Figure 10:
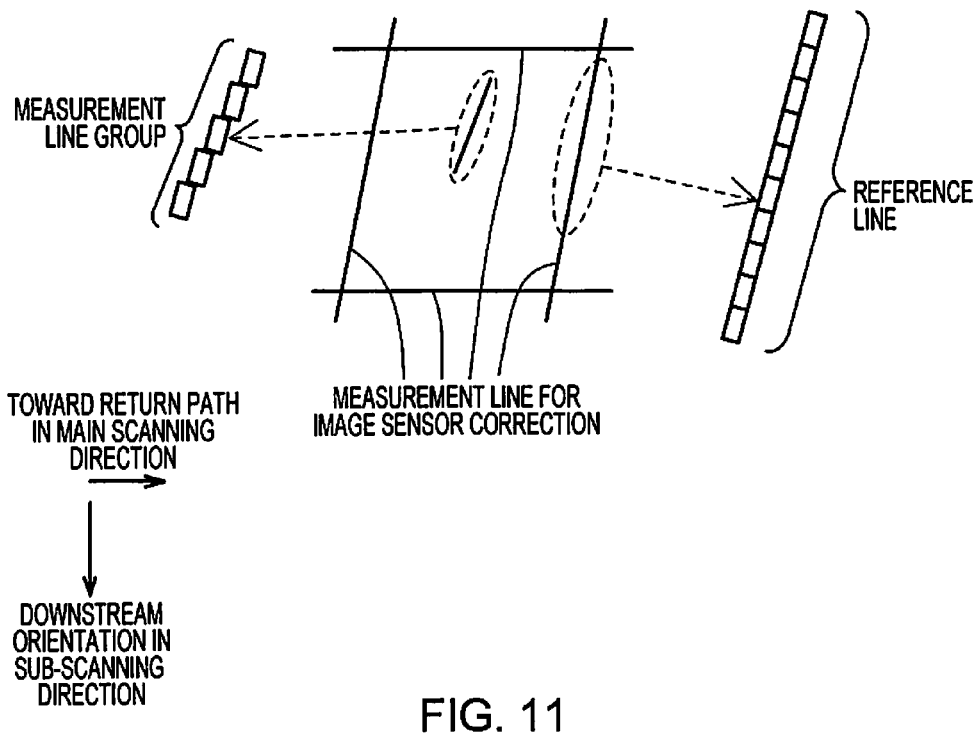
FIG. 10 is a view that shows a measurement line for image sensor correction (Modification Example 1).

Modification Example 1 will be described. FIG. 10 shows measurement lines for image sensor correction that are formed in Modification Example 1. Instead of showing an image capture result from the image sensor 89, FIG. 10 shows an image that is formed in a practical sense. The measurement lines for image sensor correction are formed in order to correct an image capture result from the image sensor 89. As shown in FIG. 10, the reference line in Modification Example 1 is formed as a portion of the measurement lines for image sensor correction.

The measurement lines for image sensor correction in Modification Example 1 are configured by 4 line segments. Each line segment is a dot group in which dots are arranged in a single row. The 4 line segments are formed in a double cross shape. The double cross shape that is referred to in this instance is a shape that is configured from an oblong form and extended lines that extend from each vertex of the oblong form. The extended lines are lines in which two edges that are connected to each vertex are extended.

The formation of the measurement lines for image sensor correction is executed in place of S110 of the embodiment. In other words, the dots that are included in the measurement lines for image sensor correction are all formed in the first pass. As shown in FIG. 10, the measurement lines for image sensor correction are formed as a parallelogram having angles that depend on the inclination of the recording head 90.

Figure 11:
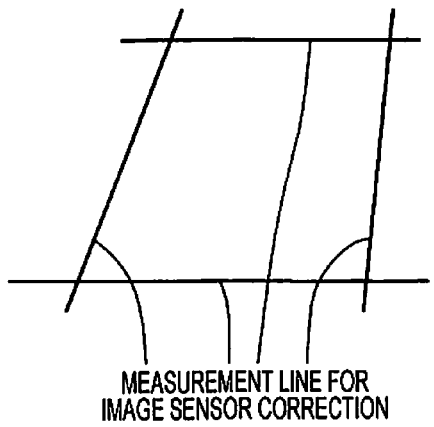
FIG. 11 is a view that shows a state in which an image of the measurement line for image sensor correction is captured in a distorted manner.

FIG. 11 shows an image capture result from the image sensor 89. Image capturing is executed after the formation of the measurement line groups. As shown in FIG. 11, the measurement lines for image sensor correction, as the image capture result, is distorted. More specifically, an image of the above-mentioned parallelogram is captured as a trapezoid. The cause of this distortion is the fact that the image sensor 89 is not directly facing the recording medium P as a result of inclination of the recording head 90. This distortion was disregarded in the above-mentioned embodiment, but it is preferable that it is corrected during the calculation of the inclination of the recording head 90. This correction can be realized using well-known trapezoid correction.

Figure 12:
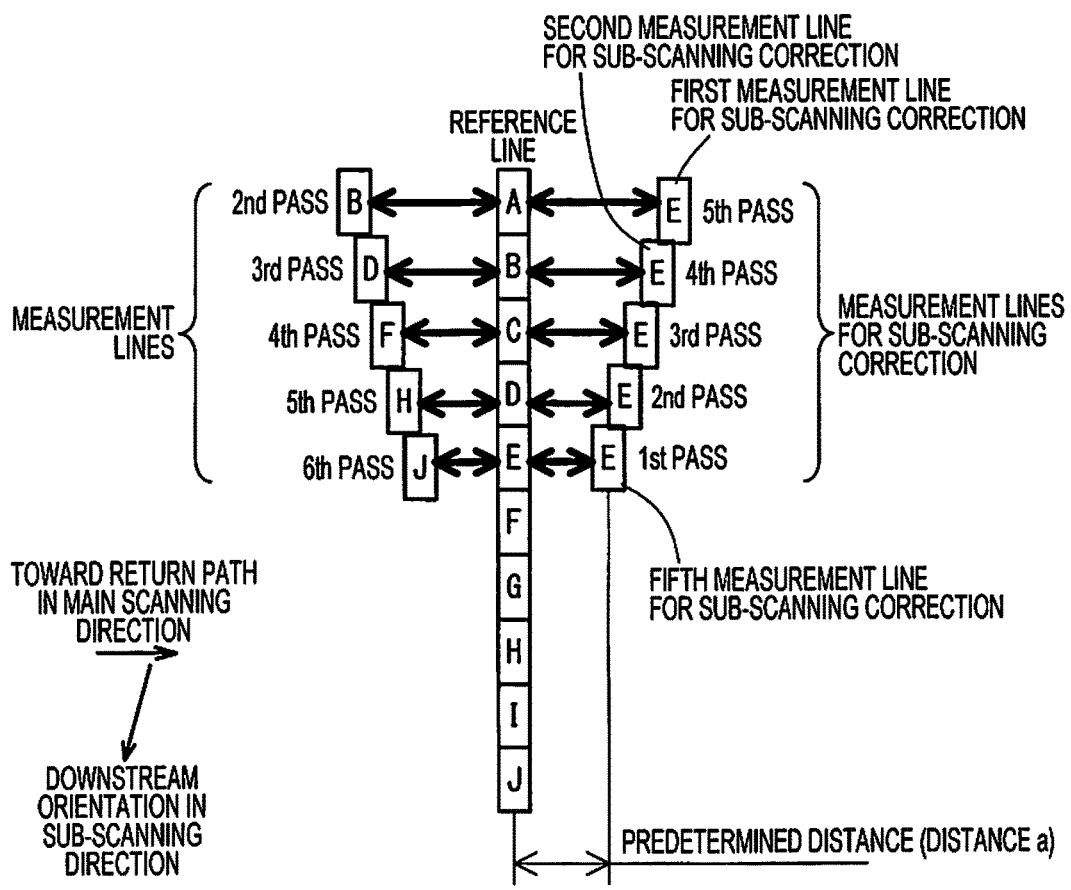
FIG. 12 is a view that shows a state in which a sub-scanning direction measurement line is formed (Modification Example 2).

Modification Example 2 will be described. FIG. 12 shows an aspect in which sub-scanning direction measurement lines are formed in addition to the reference line and the measurement line. As shown in FIG. 12, the reference line is orthogonal to the main scanning direction and is not inclined. In other words, the recording head 90 is not inclined. Regardless of this, the measurement line is inclined with respect to the reference line. As shown in FIG. 12, the reason for this is a phenomenon in which the sub-scanning direction is not orthogonal to the main scanning direction. It is preferable that the inclination of the recording head 90 is calculated after correcting this kind of inclination of the sub-scanning direction. The correction can be realized using measurement lines for sub-scanning correction.

The measurement lines for sub-scanning correction are configured by first to fifth measurement lines for sub-scanning correction. All of the first to fifth measurement lines for sub-scanning correction are formed using a dot group E, which is a predetermined nozzle group. All of the first to fifth measurement lines for sub-scanning correction are formed in positions that are separated in the main scanning direction from the position in the main scanning direction at which the reference line is formed, by predetermined distances.

As shown in FIG. 12, the fifth measurement line for sub-scanning correction is formed in a first pass. A distance from the dot group E that is included in the reference line up to the fifth measurement line for sub-scanning correction (hereinafter, a distance a) is equivalent to the above-mentioned predetermined distance. The reason for this is that the distance a is not subjected to the influence of inclination of the sub-scanning direction or inclination of the recording head 90.

The fourth measurement line for sub-scanning correction is formed in a second pass, the third measurement line for sub-scanning correction is formed in a third pass, the second measurement line for sub-scanning correction is formed in a fourth pass, and the first measurement line for sub-scanning correction is formed in a fifth pass.

While the distances from the first to fifth measurement lines for sub-scanning correction up to the dot groups A to E that configure the reference line reflect inclination of sub-scans, the distances are not subjected to the influence of inclination of the recording head 90. The reason for this is that the first to fifth measurement lines for sub-scanning correction are formed using the same dot group. Accordingly, it is possible to calculate inclination of the sub-scans on the basis of these distances. More specifically, it is possible to perform calculation in the same manner as the method that is described together with FIG. 9.

The invention is not limited to the embodiment, examples and modification examples of the present specification, and it is possible to realize various configurations within a range that does not depart from the gist thereof. For example, the technical features of the embodiments, examples and modification examples that correspond to technical features of each aspect that is set forth in the summary columns of the invention, may be replaced, combined, or the like, as appropriate in order to solve a portion of or all of the above-mentioned technical problems, of in order to achieve a portion of or all of the above-mentioned effects. As long as the technical features are not described as essential features in the present specification, it is possible to remove them as appropriate. For example, the following are illustrated by way of example.

The nozzles that configure the first nozzle group and the nozzles that configure the second nozzle group may be the same. In this case, the sub-scans are executed between the first formation and the second formation, and the first formation and the second formation are executed in separate main scan passes.

A distance from a position of the recording head in the main scanning direction in the first formation up to a position of the recording head in the main scanning direction in the third formation may differ from a distance from a position of the recording head in the main scanning direction in the second formation up to a position of the recording head in the main scanning direction in the fourth formation. In this case, the difference in the corresponding distances may be offset in the standardization (S220).

A position of the recording head in the main scanning direction in the first formation may differ from a position of the recording head in the main scanning direction in the second formation. For example, the first formation may be executed, and the second formation may be executed thereafter in the same main scan pass.

Among the first to fourth formations, the orientations of sub-scans that are executed need not necessarily all be the same. For example, in a case in which the same reference line and measurement line as those of the embodiment are formed, if the third formation is executed first, and a first sub-scan, the fourth formation, a second sub-scan, the first formation, and the second formation are sequentially executed, the second sub-scan has an orientation that is opposite to that of the first sub-scan.

The nozzles that configure the second nozzle group may differ from the nozzles that configure the third nozzle group. For example, the second nozzle group may be the nozzle group B and the third nozzle group may be the nozzle group C.

The second nozzle row distance need not necessarily be twice the first nozzle row distance. For example, if the nozzle group E is used as the fourth nozzle group, the second nozzle row distance is three times the first nozzle row distance.

The inclination may be calculated from the first dot group to the fourth dot group only. In this case, the statistical processing such as the least-square technique need not necessarily be performed.

The first formation and the third formation need not necessarily be executed during main scans having the same orientation. Alternatively, the second formation and the fourth formation need not necessarily be executed during main scans having the same orientation. In a case of execution during main scans having different orientations, shifting in the landing positions as a result of the orientation of the main scan may be measured, and the measurement results may be reflected in the inclination calculation.

The image sensor need not necessarily be mounted in the recording head. For example, the image sensor may be fixed to a predetermined range of a recording medium so that it is possible to capture an image.

The lengths of all of the first to fourth dot groups need not necessarily be the same. For example, while the lengths of dot groups that are formed in substantially the same positions in the sub-scanning direction are the same, the lengths of dot groups that are formed in different positions in the sub-scanning direction may differ.

A method that uses an inspection apparatus may be used. In other words, a main constituent of the execution of the inclination acquisition process need not be a CPU that is mounted in a dot recording apparatus, and may be an inspection apparatus as an external apparatus. The inspection apparatus may be connected to a dot recording apparatus, may control the main scan driving mechanism and the sub-scan driving mechanism, and may acquire the inclination of the recording head from an image capture result that is acquired from an image sensor.

The invention can also be applied to various dot recording apparatuses, and for example, can be applied to apparatuses that form dots by ejecting liquid droplets onto a substrate. Furthermore, the invention may be adopted in liquid ejecting apparatus that eject liquids other than ink, and can be appropriated in various liquid ejecting apparatus that are provided with liquid ejecting heads that eject microscopic amounts of liquid droplets.

Liquid droplets refer to a state of a liquid that is ejected from the above-mentioned liquid ejecting apparatuses, and include a granule form, a tear form, and a filament form that leaves a trail. In addition, the liquid that is referred to in this instance may be any material that a liquid ejecting apparatus can eject. For example, the liquid may be any substance that is in a state in which it is in the liquid phase, and may include liquids in which particles of organic material that are formed from solid matter such as a pigment or metal particles are dissolved, dispersed, or mixed into a solvent in addition to liquid states having high or low viscosities, fluid states such as sols, gel waters, other inorganic solvents, organic solvents, liquid solutions, liquid resins, liquid metals (metallic melts) or substances in a single state. In addition, an ink, liquid crystal or the like such as that described in the abovementioned embodiment can be given as a representative example of the liquid.

In this instance, ink can include various liquid compositions such as a general water-based ink or oil-based ink, a gel ink, or a hot melt ink. As a specific example of a liquid ejecting apparatus, for example, it is possible to use liquid ejecting apparatuses that eject liquids that include materials such as electrode materials and color materials, which are used in the manufacturing of liquid crystal displays, EL (electroluminescence) displays, surface-emitting displays, color filters and the like in a dispersed or dissolved form.

Liquid ejecting apparatuses that eject living organic material that is used in the manufacture of biochips, liquid ejecting apparatuses, textile printing equipment, microdispensers or the like that eject liquids that form specimens that are used as precision pipettes, and the like can also be used. Furthermore, a liquid ejecting apparatus that ejects a lubricating oil with pinpoint precision in a precision instrument such as a watch or a camera, a liquid ejecting apparatus that ejects a transparent resin liquid such as an ultraviolet curable resin for forming a microhemispherical lens (an optical lens) or the like that is used in optical communication elements or the like onto a substrate, or a liquid ejecting apparatus that ejects an etching liquid such as an acid or an alkali for etching a substrate or the like, may also be used.

This application claims priority under 35 U.S.C. § 119 to Japanese Patent Application No. 2015-216384, filed Nov. 4 2015. The entire disclosure of Japanese Patent Application No. 2015-216384 is hereby incorporated herein by reference.

What is claimed is:

1. A dot recording apparatus comprising:
   a main scan driving mechanism that executes a main scan pass to record dots on a medium while relatively moving a recording head having a nozzle row and the medium in a main scanning direction, the nozzle row including a plurality of nozzle groups configured by a plurality of nozzles arranged in a direction that intersects the main scanning direction;
   a sub-scan driving mechanism that executes a sub-scan to relatively move the medium and the recording head in a sub-scanning direction that intersects the main scanning direction;
   an image sensor that captures an image of dots formed on the medium; and
   a control section,
   wherein the control section executes
      a first formation that forms a first dot group using a first nozzle group,
      a second formation that forms a second dot group in a position that differs from that of the first dot group in either the main scanning direction or the sub-scanning direction, using a second nozzle group,
      a third formation that forms a third dot group such that a position of the third dot group in the sub-scanning direction overlaps with at least a portion of the first dot group, using a third nozzle group, with a distance from the first nozzle group to the third dot group in a direction of the nozzle now being a first nozzle row distance,
      a fourth formation that forms a fourth dot group such that a position of the fourth dot group in the sub-scanning direction overlaps with at least a portion of the second dot group, using a fourth nozzle group, with a distance from the second nozzle group to the fourth dot group in a direction of the nozzle row being a second nozzle row distance which differs from the first nozzle row distance, and
      a calculation of inclination of the recording head with respect to the medium based on a first distance in the main scanning direction from the first dot group up to the third dot group, and a second distance in the main scanning direction from the second dot group up to the fourth dot group, which are acquired using the image sensor.

2. The dot recording apparatus according to claim 1,
   wherein the nozzles that configure the first nozzle group and the nozzles that configure the second nozzle group differ from one another, and
   the first formation and the second formation are executed in the same main scan.

3. The dot recording apparatus according to claim 2,
   wherein a position of the recording head in the main scanning direction in the first formation is the same as a position of the recording head in the main scanning direction in the second formation.

4. The dot recording apparatus according to claim 1,
   wherein a distance from a position of the recording head in the main scanning direction in the first formation up to a position of the recording head in the main scanning direction in the third formation is equivalent to a distance from a position of the recording head in the main scanning direction in the second formation up to the position of the recording head in the main scanning direction in the fourth formation.

5. The dot recording apparatus according to claim 1,
   wherein at least two sub-scans are executed during a period from a point of a formation, among the first to the fourth formation, which is executed first up to a point of a formation that is executed last, and
   all orientations of the at least two sub-scans are the same.

6. The dot recording apparatus according to claim 1,
   wherein the nozzles that configure the second nozzle group are the same as the nozzles that configure the third nozzle group.

7. The dot recording apparatus according to claim 1,
   wherein the second nozzle row distance is twice the first nozzle row distance.

8. The dot recording apparatus according to claim 7,
   wherein the control section executes
   a fifth formation that forms a fifth dot group using a fifth nozzle group, a sixth formation that forms a sixth dot group in which the position in the sub-scanning direction overlaps with at least a portion of the fifth dot group, using a sixth nozzle group, of which the pitch from the fifth nozzle group is a third nozzle row distance, which differs from both the first nozzle row distance and the second nozzle row distance, and the calculation of inclination on the basis of a result in which the first distance, the second distance, and a distance in the main scanning direction from the fifth dot group up to the sixth dot group are statistically processed.

9. The dot recording apparatus according to claim 1, wherein the first formation and the third formation are executed during main scans having the same orientation, and the second formation and the fourth formation are executed during main scans having the same orientation.

10. The dot recording apparatus according to claim 1, wherein all lengths of the first to fourth dot groups are the same.

11. The dot recording apparatus according to claim 1, wherein a measurement line for image sensor correction is formed in order to acquire an inclination of the image sensor, and the inclination of the recording head is corrected by adding an image capture result of the measurement line for image sensor correction from the image sensor.

12. The dot recording apparatus according to claim 11, wherein at least either one of the first dot group and the second dot group is a portion of the measurement line for image sensor correction.

13. The dot recording apparatus according to claim 1, wherein formation of a first measurement line for sub-scan correction in which the position in the sub-scanning direction overlaps with at least a portion of the first dot group, using a predetermined nozzle group, which is any one of the plurality of nozzle groups, formation of a second measurement line for sub-scan correction in which the position in the sub-scanning direction overlaps with at least a portion of the second dot group, using the predetermined nozzle group, and calculation of inclination in the main scanning direction and the sub-scanning direction on the basis of a distance in the main scanning direction from the first dot group up to the first measurement line for sub-scan correction, and a distance in the main scanning direction from the second dot group up to the second measurement line for sub-scan correction, which are acquired using the image sensor, are executed.

14. An inspection apparatus that causes a control section of a dot recording apparatus to execute a first formation that forms a first dot group using a first nozzle group, a second formation that forms a second dot group in a position that differs from that of the first dot group in either a main scanning direction or a sub-scanning direction, using a second nozzle group, a third formation that forms a third dot group such that a position of the third dot group in the sub-scanning direction overlaps with at least a portion of the first dot group, using a third nozzle group, with a distance from the first nozzle group to the third dot group in a direction of the nozzle row being a first nozzle row distance, and a fourth formation that forms a fourth dot group such that a position of the fourth dot group in the sub-scanning direction overlaps with at least a portion of the second dot group, using a fourth nozzle group, with a distance from the second nozzle group to the fourth dot group in a direction of the nozzle row being a second nozzle row distance which differs from the first nozzle row distance, and to calculate inclination of a recording head with respect to a medium on the basis of a first distance in the main scanning direction from the first dot group up to the third dot group, and a second distance in the main scanning direction from the second dot group up to the fourth dot group, which are acquired using an image sensor, the dot recording apparatus including a main scan driving mechanism that executes a main scan pass to record dots on the medium while relatively moving the recording head having a nozzle row and the medium in a main scanning direction, the nozzle row including a plurality of nozzle groups configured by a plurality of nozzles arranged in a direction that intersects the main scanning direction, a sub-scan driving mechanism that executes a sub-scan to relatively move the medium and the recording head in the sub-scanning direction that intersects the main scanning direction, the image sensor to capture an image of dots formed on the medium, and the control section.

15. An inspection method in which a control section executes a first formation that forms a first dot group using a first nozzle group, a second formation that forms a second dot group in a position that differs from that of the first dot group in either a main scanning direction or a sub-scanning direction, using a second nozzle group, a third formation that forms a third dot group such that a position of the third dot group in the sub-scanning direction overlaps with at least a portion of the first dot group, using a third nozzle group, with a distance from the first nozzle group to the third dot group in a direction of the nozzle row being a first nozzle row distance, a fourth formation that forms a fourth dot group such that a position of the fourth dot group in the sub-scanning direction overlaps with at least a portion of the second dot group, using a fourth nozzle group, with a distance from the second nozzle group to the fourth dot group in a direction of the nozzle row being a second nozzle row distance which differs from the first nozzle row distance, and calculation of inclination of a recording head with respect to a medium on the basis of a first distance in the main scanning direction from the first dot group up to the third dot group, and a second distance in the main scanning direction from the second dot group up to the fourth dot group, which are acquired using an image sensor, and wherein the execution is performed by using a main scan driving mechanism that executes a main scan pass to record dots on the medium while relatively moving the recording head having a nozzle row and the medium in a main scanning direction, the nozzle row including a plurality of nozzle groups configured by a plurality of nozzles arranged in a direction that intersects the main scanning direction, a sub-scan driving mechanism that executes a sub-scan to relatively move the medium and the recording head in the sub-scanning direction that intersects the main scanning direction, and the image sensor to capture an image of dots formed on the medium.

* * * * *